United States Patent [19]

Gachot

[11] 4,235,003
[45] Nov. 25, 1980

[54] METHOD OF MANUFACTURE OF A BALL VALVE

[76] Inventor: Jean Gachot, 26 bis avenue de Paris, 95230 Soisy-Sous-Montmorency, France

[21] Appl. No.: 14,212

[22] Filed: Feb. 22, 1979

[30] Foreign Application Priority Data

Mar. 9, 1978 [FR] France ............................ 78 06786

[51] Int. Cl.³ ...................... B23P 15/00; B23K 31/00
[52] U.S. Cl. ................................ 29/157.1 R; 228/214
[58] Field of Search .................. 29/157.1 R; 251/315, 251/304, 309, 366, 367; 228/216, 215, 214

[56] References Cited

U.S. PATENT DOCUMENTS

| 3,157,190 | 11/1964 | Allen | 251/315 |
| 3,241,808 | 3/1966 | Allen | 251/315 |
| 3,460,802 | 8/1969 | Colby et al. | 29/157.1 R |
| 3,919,756 | 11/1975 | Kajrup | 29/157.1 R |

FOREIGN PATENT DOCUMENTS

| 687567 | 5/1964 | Canada | 251/315 |
| 357311 | 3/1938 | Italy | 29/157.1 R |

*Primary Examiner*—Daniel C. Crane
*Attorney, Agent, or Firm*—Young & Thompson

[57] ABSTRACT

A hollow valve body having two hubs for connection to a piping system and containing a spherical plug or ball is constituted by two shells cut from pipe sections. Each shell is shaped so as to form a flared-out portion in a spherical zone, the edge of which is provided with a semicircular notch. A sleeve having a recess at the inner end so as to form a valve seat is welded in position within one of the hub connections. The ball is enclosed between the two shells which are joined together by welding. A second sleeve also provided at the inner end with a valve seat is welded in position within the other hub connection. A stuffing-box is engaged on the ball-operating rod and welded to the orifice formed by the two oppositely-facing semicircular notches.

4 Claims, 5 Drawing Figures

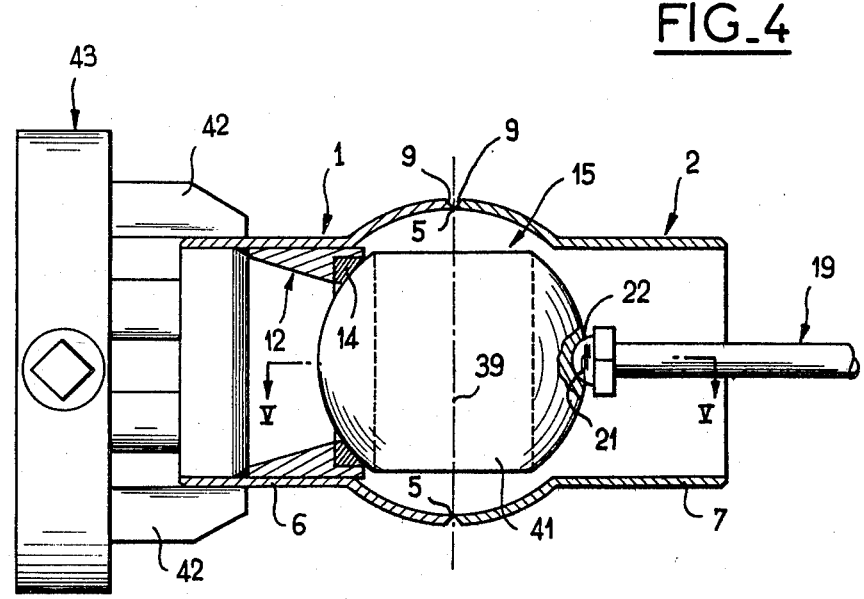
FIG_4
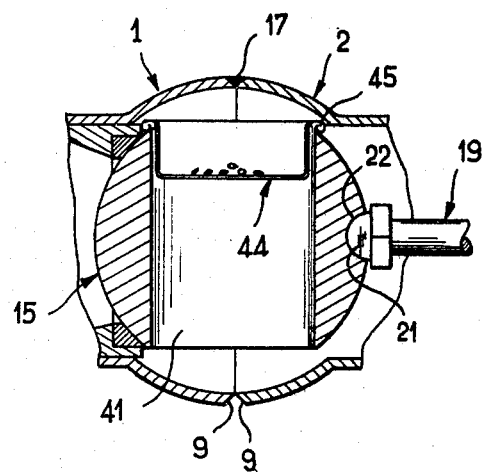
FIG_5

METHOD OF MANUFACTURE OF A BALL VALVE

The present invention relates to a method for manufacturing a ball valve, that is, a valve having a spherical plug.

A ball valve comprises a spherical plug designated as a ball rotatably mounted within a valve body having two tubular hubs for connecting the valve to a piping system.

Since the diameter of the passageway through the ball corresponds to the nominal diameter of the pipe, the ball diameter must consequently be distinctly larger than said nominal diameter. This results in certain complications in the manufacture of the valve body for the purpose of mounting the ball in this latter. Whether the valve body is obtained by molding or by die-stamping according to the dimensions of the body and the number of valves to be manufactured in a production run, this results in a relatively high machining cost which is added to that of a substantial weight of material.

In a certain number of applications, however, valves of this type are permanently placed in position and normally achieve a standard of quality which is such as to dispense with any need for maintenance other than replacement when they become unserviceable. The fact that they can be disassembled therefore does not correspond to any special advantage whereas this valve design results in a weight and cost price which are both of a relatively high order.

The aim of this invention is to provide a method of manufacture of ball valves which involves a remarkable reduction in weight of material employed and in production costs.

In the method according to the invention, it is intended to manufacture a ball valve comprising a hollow valve body provided with two hubs for connecting the valve to a piping system, said valve body being adapted to contain a spherical plug or ball pierced by a diametrical passageway and rotatably mounted within said body, said ball being connected to an operating rod which traverses the valve body through a stuffing-box. Said method essentially consists in carrying out the following successive operations:

(a) two sections of tube of the nominal diameter of the valve to be manufactured are each cut to a length which is substantially one-half the intended length of the valve;

(b) one end of each sectiion is given a flared-out shape approximately in a spherical zone in order to constitute shells, the edge of the flared-out portion being located substantially on a great circle of the sphere to which the zone belongs, the diameter of said sphere being larger than that of the ball;

(c) a sliding sleeve fitted at one end with a ring forming a valve-seat for the ball is inserted into the hub connection of one of the shells designated as the first shell and said sleeve is welded in position within said shell;

(d) the ball is positioned between the two shells;

(e) the edges of the flared-out portions of the two shells are brought together so as to enclose the ball and then welded to each other;

(f) a sliding sleeve fitted with a ring forming a valve-seat is inserted in the second shell and applied against the ball, whereupon the sleeve is welded in position within the second shell.

At one and the same time, the problem of insertion of the ball in the valve body is solved and said valve body is constructed from lightweight and inexpensive elements of drawn metal without having recourse either to molding or to die-stamping.

In a preferred embodiment of the method, a semicircular notch is formed on the edge of each flared-out portion before welding the two shells to each other, said notches being placed in oppositely-facing relation at the moment of welding so as to constitute a circular orifice through which the operating rod is intended to pass.

This stage makes it possible to apply the method in the case of an operating rod which is formed in one piece with the ball since the introduction of a unit of this type no longer presents any difficulty.

When the above-mentioned operation (f) has been completed, the next step consists in engaging a packing sleeve on the operating rod and in welding a stuffing-box to the edge of the circular orifice aforesaid after having placed the ball in its final position and engaged the end of the operating rod in the slot formed in the ball for this purpose.

The unit formed by the valve body and stuffing-box is therefore entirely fabricated from sections of piping assembled together by welding, thus minimizing the number of additional machining operations to be performed.

In an improved embodiment of the method for welding the two shells together, the following operations are carried out:

(g) the ball is oriented in such a manner as to ensure that the axis of the passageway which extends through said ball is located substantially in the plane of the welded joint which is to be made in order to assemble the two shells together;

(h) by means of the operating rod, the ball and all the pipe sections to be joined together are subjected to a relative movement of rotation with respect to each other in such a manner as to ensure that the orifice of the ball comes successively opposite to all the points of the weld fillet to be formed;

(i) the progression of the welding operation and the rotation of the ball are synchronized in such a manner as to ensure that the end of the weld fillet during the welding operation is located continuously opposite to one of the orifices of the ball.

The metal of the ball is thus always relatively distant from the point at which the welding operation is being effected, thereby preventing even slight damage to the ball which would be liable to impair leak-tightness of the valve.

A container is preferably placed within the passageway of the ball in order to receive projections of molten metal during the welding operation.

No other protective measures need be taken in order to guard the valve ball against any phenomena arising from the welding operation.

Further characteristic features and advantages of the invention will become apparent from the following detailed description, reference being made to the accompanying drawings which are given by way of example and not in any limiting sense, and wherein:

FIG. 4 is a longitudinal sectional view which illustrates the welding operation aforementioned;

FIG. 5 is a sectional view taken along line V—V of FIG. 4.

Figure 1:
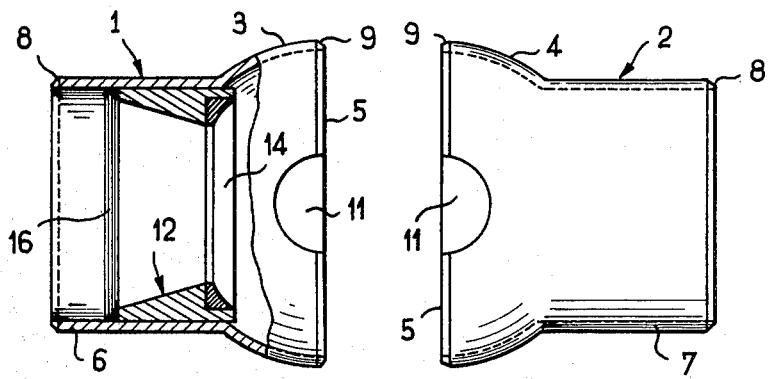
FIG. 1 is a plan view of the two shells immediately before they are welded together.

Referring now to FIG. 1, the method in accordance with the invention consists in the initial use of two pipe sections 1 and 2 on which a flared-out portion 3, 4 is formed by means of a shaping process in a spherical zone such that the edge 5 of each flared-out portion is located substantially on a great circle of the sphere of which said zone forms a part.

The non-shaped portions 6, 7 constitute tubular hubs for connecting the valve to a piping system and are accordingly provided with welding chamfers 8.

Provision is also made on the edges 5 of the flared-out portions for a welding chamfer 9 in addition to two semicircular notches 11 which constitute a substantially circular opening when the edges 5 of the two shells 1 and 2 are suitably applied against each other. The dimensions of said notches will be specified hereinafter.

Figure 2:
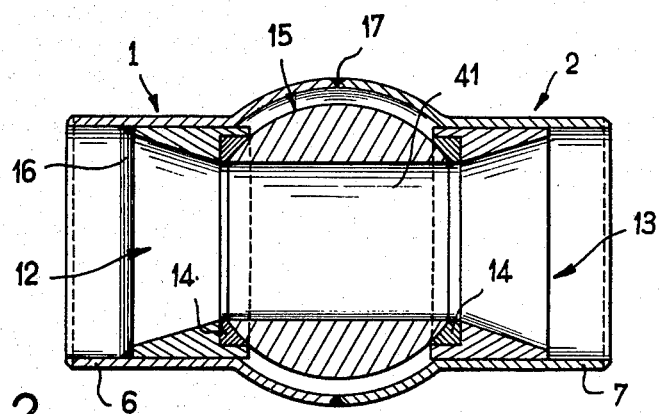
FIG. 2 is a longitudinal sectional view of the valve immediately after the welding operation aforementioned.
Figure 3:
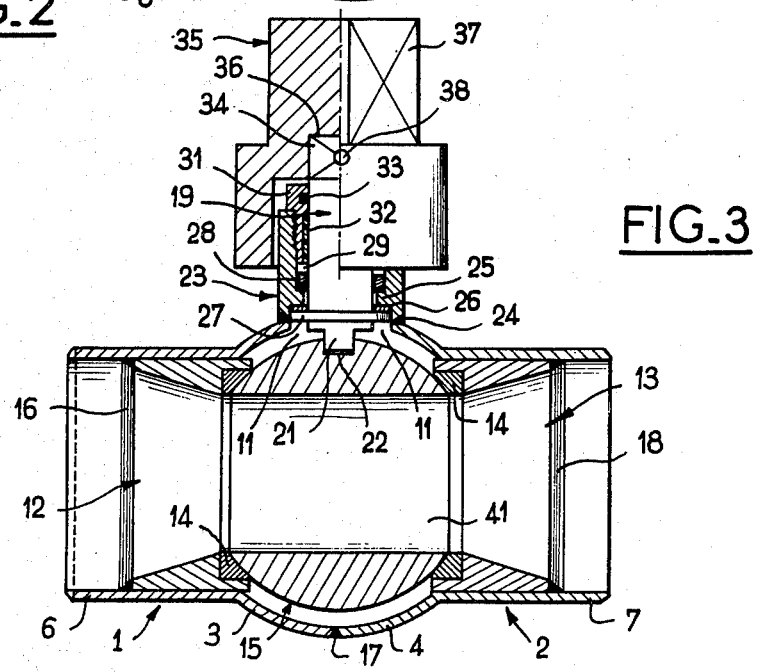
FIG. 3 is a view which is similar to FIG. 2 and shows a valve in the finished state.

Provision is also made for the manufacture of two sleeves 12, 13 (as shown in FIGS. 1 to 3), a recess being formed in the inner end of each sleeve and a ring 14 being fitted in said recess. Said ring forms a seat for a ball 15 (as shown in FIG. 3) which will be described hereinafter and can advantageously be formed of polytetrafluoroethylene. The external diameter of the sleeves 12, 13 is slightly smaller than the internal diameter of the hub connections 6, 7 in order to permit insertion of the sleeves by sliding them within these latter.

The sleeve 12 is then welded within the hub connection 6 by means of a weld fillet 16 (as shown in FIG. 2) and held in position during this operation by means of a jig (not shown in the drawings).

The edges 5 of the shells 1 and 2 are then applied against each other in such a manner as to enclose the ball 15 and to locate the semicircular notches 11 in oppositely-facing relation. The edges 5 are then welded together by means of a weld fillet 17 (as shown in FIG. 2) in order to form the valve body as a result of assembly of the two shells 1 and 2. An advantageous method of formation of the weld fillet 17 will hereinafter be described in detail.

When the weld fillet 17 has been completely formed, the sleeve 13 is introduced into the hub connection 7 (as shown in FIG. 2) and fixed in position by means of a weld fillet 18 (as shown in FIG. 3) while maintaining the seat 14 of the sleeve 13 applied against the ball 15 under a predetermined pressure, with the result that leak-tightness and easy operation of the valve are both ensured in a manner known per se. This welding operation is performed by immersing the greater part of the valve in water in order to limit heat buildup arising from the welding operation.

After this operation, an operating rod 19 is placed in position. Said rod terminates in a flattened end 21 which cooperates with a slot 22 of the ball 15 so as to form a screwdriver coupling (as shown in FIG. 3). A stuffing-box 23 is then engaged on the operating rod and welded by means of a fillet 24 to the edge of the orifice formed by the semicircular notches 11.

During this operation, an annular shoulder 25 of the stuffing-box 23 is applied by means of a washer 26 against an annular flange 27 of the operating rod 19 in order to prevent this latter from being driven out if the pressure of the fluid were accidentally exerted on the exterior of the ball 15. The notches 11 must therefore provide a circular opening of sufficient diameter to permit insertion of the annular flange 27.

An O-ring seal 28 and a bush 29 are then inserted into the stuffing-box, whereupon a packing gland 31 is screwed in position so as to cooperate laterally with the operating rod 19 by means of a packing sleeve 32 of polytetrafluoroethylene and by means of another O-ring seal 33.

Before positioning the operating rod 19, it can be first fitted with its packing sleeve and then placed in position. It will be noted that, aside from the alternative embodiment just mentioned, the method described thus far applies to the manufacture of a valve in which the operating rod is formed in one piece with the ball.

In order to complete the construction of the valve, a flattened upper extremity 34 of the operating rod 19 is covered by an actuating component 35 provided with a corresponding cavity 36 and which external square head 37 for operating the valve. The actuating component 35 is held in position by means of a dowel-pin 38.

Referring to FIGS. 4 and 5, there will now be described in detail an advantageous method of formation of the weld fillet 17 for joining together the shells 1 and 2.

Contrarily to what has been stated in the foregoing, this method is not applicable if the operating rod is formed in one piece with the valve ball.

By placing the ball 15 between the shells 1 and 2 which are applied against each other, said ball is oriented in such a manner as to ensure that the axis 39 of the passageway 41 which extends through said ball is located substantially in the plane of the edges 5 and of the weld fillet 17 to be formed (as shown in FIG. 4). The slot 22 is accordingly directed towards one of the hub connections such as the hub connection 7, for example. The flattened extremity 21 of the operating rod 19 is then engaged within said slot whilst the opposite hub connection 6 is gripped within the jaws 42 of a rotary mandrel 43 (as shown in FIG. 4).

Provision is made for a welding machine (not shown in the drawings) which is intended to make a spot weld between the chamfers 9 opposite to the opening of the passageway 41, that is to say in the place of FIG. 4.

The welding machine is started-up while at the same time initiating the rotation of the mandrel 43 so as to displace the edges 5 in continuous relative motion in front of the machine at a speed which is compatible with the characteristics of said machine. At the same time, the ball is applied against the seat 14 of the sleeve 12 and maintained stationary by means of the operating rod 19, said rod being clamped in position by means which have not been illustrated. During this relative movement, the ball 15 slides on the valve seat 14.

The welding operation thus takes place opposite to the passageway 41 in a continuous manner, with the result that the ball 15 is not liable to suffer from any temperature rise produced by this operation.

In order to collect projections and droplets of molten weld metal which are liable to fall into the interior of the valve body, provision is made in the opening of the passageway 41 for a container 44 which is supported by means of a flange 45 on that edge of said passageway 41 which is nearest the point of execution of the weld (as shown in FIG. 5). Said container is placed in position by putting the ball in its normal position as shown in FIG. 3.

On completion of the welding operation, the ball is replaced in its normal position and the container 4 is withdrawn.

This method of manufacture is applicable to ball valves of all sizes and permits a weight reduction to approximately one-half the weight of the same valve having either a molded or die-stamped body. Furthermore, machining operations are considerably simplified and a very appreciable reduction in cost price is achieved.

As can readily be understood, the invention is not limited to the example hereinabove described but extends to any alternative form of construction based on the same principle.

I claim:

1. A method for manufacturing a ball valve comprising a hollow body provided with two hubs for connecting the valve to a piping system, said valve body being adapted to contain a spherical plug or ball pierced by a diametrical passageway and rotatably mounted within said body, said ball being connected to an operating rod which traverses the valve body through a stuffing-box, comprising performing the following successive operations:

(a) cutting each of two sections of tube of the nominal diameter of the valve to be manufactured to a length which is substantially one-half the intended length of the valve;

(b) imparting to one end of each section a flared-out shape approximately in a spherical zone in order to constitute two shells, the edge of the flared-out portion being located substantially on a great circle of the sphere to which the zone belongs, the internal diameter of said hollow sphere being larger than that of the ball;

(c) fitting a sliding sleeve at one end with a ring forming a valve-seat for the ball and inserting said sleeve into one of the shells designated as the first shell and welding said sleeve in position within said shell in its precise and definitive location;

(d) positioning the ball between the two shells;

(e) bringing together the edges of the flared-out portions of the two shells so as to enclose the ball and then welding said edges to each other;

(f) fitting a sliding sleeve with a ring forming a valve-seat and inserting the latter sleeve in the second shell and applying the latter valve seat against the ball, and then welding the latter sleeve in position within said second shell;

the two shells being welded together by means of the following operations:

(g) orienting the ball in such a manner as to ensure that the axis of the passageway which extends through said ball is alocated substantially in the plane of the welded joint which is to be made in order to assemble the two shells together;

(h) subjecting, by means of the operating rod, the ball and all the shells to be joined together to a relative movement of rotation with respect to each other in such a manner as to ensure that the passageway of the ball comes successively opposite to all the points of the weld fillet to be formed;

(i) and synchronizing the progression of the welding operation and the rotation of the ball in such a manner as to ensure that the end of the weld fillet during the welding operation is located continuously opposite to one of the passageways of said ball.

2. A method according to claim 1, and forming a semi-circular notch in the edge of each flared-out portion before welding the two shells together, and placing said notches in oppositely facing relation at the moment of welding so as to form a circular orifice through which the operating rod can be passed.

3. A method according to claim 2, and, upon completion of said operation (f), engaging a packing sleeve on the operating rod and welding a stuffing box to the edge of said circular orifice.

4. A method as claimed in claim 1, and placing a container within the passageway of the ball in order to receive projections of molten metal during the welding operation.

* * * * *